United States Patent
Rayburn (10) Patent No.: US 8,363,704 B1
(45) Date of Patent: Jan. 29, 2013

(54) METHOD OF TRANSMITTING INFORMATION USING A BANDWIDTH LIMITED COMMUNICATIONS CHANNEL (76) Inventor: David C. Rayburn, Merrit Island, FL (US)

(*) Notice: Subject to any disclaimer, the term of this patent is extended or adjusted under 35 U.S.C. 154(b) by 1013 days.

(21) Appl. No.: 12/354,365

(22) Filed: Jan. 15, 2009

Related U.S. Application Data (63) Continuation-in-part of application No. 10/893,687, filed on Jul. 16, 2004, now abandoned.

(60) Provisional application No. 60/489,598, filed on Jul. 24, 2003.

(51) Int. Cl.
H04B 1/38 (2006.01)

(52) U.S. Cl. .................. 375/219; 375/295; 375/316

(58) Field of Classification Search .................. 375/222, 375/260, 267, 295, 316, 219
See application file for complete search history.

(56) References Cited

U.S. PATENT DOCUMENTS

| | | | |
|---|---|---|---|
| 4,641,318 A | 2/1987 | Addeo | |
| 4,720,839 A * | 1/1988 | Feher et al. | 375/291 |
| 4,998,288 A * | 3/1991 | Bui et al. | 382/279 |
| 5,122,732 A | 6/1992 | Engeler et al. | |
| 5,168,214 A | 12/1992 | Engeler et al. | |
| 5,383,457 A | 1/1995 | Cohen | |
| 5,686,922 A | 11/1997 | Stankwitz et al. | |
| 5,748,507 A | 5/1998 | Abatzoglou et al. | |
| 5,784,492 A | 7/1998 | Cohen et al. | |
| 6,483,952 B2 | 11/2002 | Gregory et al. | |
| 6,747,969 B1 | 6/2004 | Hirsch | |
| 6,781,540 B1 | 8/2004 | MacKey et al. | |
| 7,212,583 B2 * | 5/2007 | Lindh | 375/296 |
| 7,657,225 B2 * | 2/2010 | Walker et al. | 455/3.06 |
| 7,702,033 B2 * | 4/2010 | Taniguchi | 375/291 |
| 2004/0143565 A1 | 7/2004 | Berger et al. | |
| 2005/0002443 A1 | 1/2005 | Ozluturk | |
| 2005/0206551 A1 | 9/2005 | Komiak et al. | |
| 2006/0176850 A1 | 8/2006 | Gan et al. | |

OTHER PUBLICATIONS

Shannon, C.E., "A Mathematical Method of Communication", The Bell System Technical Journal, vol. 27, Jul., Oct. 1948, pp. 379-423, 623-656.
Vaughan, Rodney G. and Scott, Neil L., "Super-Resolution of Pulsed Multipath Channels for Delay Spread Characterization", IEEE Transactions on Communications, vol. 47, No. 3; Mar. 1999; pp. 343-347.
Liveris, Angelos D. and Georghiades, Costas N., "Exploiting Faster-than-Nyquist Signaling"; IEEE Transactions on Communications, vol. 51, No. 9; Sep. 2003; pp. 1502-1511.
Zakarevicius, R.A. and Feher, K., "On the Speed tolerance of Certain Classes of Data Transmission Systems"; IEEE Transactions on Communications vol. 34, No. 8; Aug. 1986; pp. 832-836.
Wang, Cheng-Kun and Lee, Lin-Shan, "Practically Realizable Digital Transmission Significantly Below the Nyquist Bandwidth"; IEEE Transactions on Communications, vol. 43, No. 2/3/4; Feb., Mar., Apr. 1995; pp. 166-169.
Ayanoglu, Ender, "Data Transmission When the Sampling Frequency Exceeds the Nyquist Rate"; IEEE Communications Letters, vol. 1, No. 6; Nov. 1997; pp. 157-159.
Mazo, James E. and Landau, Henry J.; "On the Minimum Distance Problem for Faster-than-Nyquist Signaling"; IEEE Transactions on Information Theory, vol. 34, No. 6; Nov. 1988; pp. 1420-1427.
Landau, H.J.; "Sampling, Data Transmission, and the Nyquist Rate"; Proceedings of the IEEE, vol. 55, No. 10; Oct. 1967; pp. 1701-1706.

* cited by examiner

Primary Examiner — Sam K Ahn
Assistant Examiner — Freshteh N Aghdam
(74) Attorney, Agent, or Firm — Allen, Dyer, Doppelt, Milbrath & Gilchrist, P.A.

(57) ABSTRACT

Information is sent through a bandwidth-constrained communications channel using overlapping signals separated using deconvolution to distinguish between the overlapping symbols. Input data representing the information are convolved with a kernel and transmitted through a communication system, then deconvolved with respect to the kernel for outputting the information resulting from the deconvolution.

18 Claims, 11 Drawing Sheets

| BIT | AMPLITUDE | PHASE | BIT | AMPLITUDE | PHASE | BIT | AMPLITUDE | PHASE |
|---|---|---|---|---|---|---|---|---|
| 1 | 7.8102 | 0.0641 | 41 | 7.8102 | 1.1113 | 81 | 7.8102 | 2.1585 |
| 2 | 6.0828 | 0.0823 | 42 | 6.0828 | 1.1295 | 82 | 6.0828 | 2.1767 |
| 3 | 8.7178 | 0.115 | 43 | 4.3589 | 1.1622 | 83 | 4.3589 | 2.2094 |
| 4 | 4.3589 | 0.115 | 44 | 8.7178 | 1.1622 | 84 | 8.7178 | 2.2094 |
| 5 | 7 | 0.1433 | 45 | 7 | 1.1905 | 85 | 7 | 2.2377 |
| 6 | 5.2915 | 0.1901 | 46 | 5.2915 | 1.2373 | 86 | 2.6458 | 2.2845 |
| 7 | 2.6458 | 0.1901 | 47 | 2.6458 | 1.2373 | 87 | 5.2915 | 2.2845 |
| 8 | 8.8882 | 0.227 | 48 | 8.8882 | 1.2742 | 88 | 8.8882 | 2.3214 |
| 9 | 6.245 | 0.2426 | 49 | 6.245 | 1.2898 | 89 | 6.245 | 2.337 |
| 10 | 7.2111 | 0.281 | 50 | 7.2111 | 1.3282 | 90 | 3.6056 | 2.3754 |
| 11 | 3.6056 | 0.281 | 51 | 3.6056 | 1.3282 | 91 | 7.2111 | 2.3754 |
| 12 | 8.1854 | 0.3104 | 52 | 8.1854 | 1.3576 | 92 | 8.1854 | 2.4048 |
| 13 | 9.1652 | 0.3335 | 53 | 9.1652 | 1.3807 | 93 | 9.1652 | 2.4279 |
| 14 | 4.5826 | 0.3335 | 54 | 4.5826 | 1.3807 | 94 | 4.5826 | 2.4279 |
| 15 | 5.5678 | 0.3674 | 55 | 5.5678 | 1.4146 | 95 | 5.5678 | 2.4618 |
| 16 | 6.5574 | 0.3911 | 56 | 6.5574 | 1.4383 | 96 | 6.5574 | 2.4855 |
| 17 | 7.5498 | 0.4086 | 57 | 7.5498 | 1.4558 | 97 | 7.5498 | 2.503 |
| 18 | 8.544 | 0.4221 | 58 | 8.544 | 1.4693 | 98 | 8.544 | 2.5165 |
| 19 | 2 | 0.5236 | 59 | 2 | 1.5708 | 99 | 1 | 2.618 |
| 20 | 1 | 0.5236 | 60 | 1 | 1.5708 | 100 | 2 | 2.618 |
| 21 | 8.544 | 0.6251 | 61 | 8.544 | 1.6723 | 101 | 8.544 | 2.7195 |
| 22 | 7.5498 | 0.6386 | 62 | 7.5498 | 1.6858 | 102 | 7.5498 | 2.733 |
| 23 | 6.5574 | 0.6561 | 63 | 6.5574 | 1.7033 | 103 | 6.5574 | 2.7504 |
| 24 | 5.5678 | 0.6798 | 64 | 5.5678 | 1.727 | 104 | 5.5678 | 2.7742 |
| 25 | 9.1652 | 0.7137 | 65 | 4.5826 | 1.7609 | 105 | 9.1652 | 2.8081 |
| 26 | 4.5826 | 0.7137 | 66 | 9.1652 | 1.7609 | 106 | 4.5826 | 2.8081 |
| 27 | 8.1854 | 0.7368 | 67 | 8.1854 | 1.784 | 107 | 8.1854 | 2.8312 |
| 28 | 7.2111 | 0.7662 | 68 | 3.6056 | 1.8134 | 108 | 7.2111 | 2.8606 |
| 29 | 3.6056 | 0.7662 | 69 | 7.2111 | 1.8134 | 109 | 3.6056 | 2.8606 |
| 30 | 6.245 | 0.8046 | 70 | 6.245 | 1.8518 | 110 | 6.245 | 2.899 |
| 31 | 8.8882 | 0.8202 | 71 | 8.8882 | 1.8674 | 111 | 8.8882 | 2.9146 |
| 32 | 5.2915 | 0.8571 | 72 | 2.6458 | 1.9043 | 112 | 2.6458 | 2.9515 |
| 33 | 2.6458 | 0.8571 | 73 | 5.2915 | 1.9043 | 113 | 5.2915 | 2.9515 |
| 34 | 7 | 0.9038 | 74 | 7 | 1.951 | 114 | 7 | 2.9982 |
| 35 | 8.7178 | 0.9322 | 75 | 4.3589 | 1.9794 | 115 | 8.7178 | 3.0266 |
| 36 | 4.3589 | 0.9322 | 76 | 8.7178 | 1.9794 | 116 | 4.3589 | 3.0266 |
| 37 | 6.0828 | 0.9649 | 77 | 6.0828 | 2.0121 | 117 | 6.0828 | 3.0593 |
| 38 | 7.8102 | 0.9831 | 78 | 7.8102 | 2.0303 | 118 | 7.8102 | 3.0775 |
| 39 | 3.4641 | 1.0472 | 79 | 1.7321 | 2.0944 | 119 | 1.7321 | 3.1416 |
| 40 | 1.7321 | 1.0472 | 80 | 3.4641 | 2.0944 | 120 | 3.4641 | 3.1416 |

| BIT | AMPLITUDE | PHASE | BIT | AMPLITUDE | PHASE | BIT | AMPLITUDE | PHASE |
|---|---|---|---|---|---|---|---|---|
| 121 | 7.8102 | 3.2057 | 161 | 7.8102 | 4.2529 | 201 | 7.8102 | 5.3001 |
| 122 | 6.0828 | 3.2239 | 162 | 6.0828 | 4.2711 | 202 | 6.0828 | 5.3183 |
| 123 | 4.3589 | 3.2566 | 163 | 8.7178 | 4.3038 | 203 | 8.7178 | 5.3509 |
| 124 | 8.7178 | 3.2566 | 164 | 4.3589 | 4.3038 | 204 | 4.3589 | 5.3509 |
| 125 | 7 | 3.2849 | 165 | 7 | 4.3321 | 205 | 7 | 3.3793 |
| 126 | 5.2915 | 3.3317 | 166 | 5.2915 | 4.3789 | 206 | 5.2915 | 5.4261 |
| 127 | 2.6458 | 3.3317 | 167 | 2.6458 | 4.3789 | 207 | 2.6458 | 5.4261 |
| 128 | 8.8882 | 3.3686 | 168 | 8.8882 | 4.4158 | 208 | 8.8882 | 5.4629 |
| 129 | 6.245 | 3.3842 | 169 | 6.245 | 4.4314 | 209 | 6.245 | 5.4786 |
| 130 | 3.6056 | 3.4226 | 170 | 7.2111 | 4.4698 | 210 | 7.2111 | 5.517 |
| 131 | 7.2111 | 3.4226 | 171 | 3.6056 | 4.4698 | 211 | 3.6056 | 5.517 |
| 132 | 8.1854 | 3.452 | 172 | 8.1854 | 4.4992 | 212 | 8.1854 | 5.5464 |
| 133 | 4.5826 | 3.4751 | 173 | 9.1652 | 4.5223 | 213 | 9.1652 | 5.5695 |
| 134 | 9.1652 | 3.4751 | 174 | 4.5826 | 4.5223 | 214 | 4.5826 | 5.5695 |
| 135 | 5.5678 | 3.509 | 175 | 5.5678 | 4.5562 | 215 | 5.5678 | 5.6034 |
| 136 | 6.5574 | 3.5327 | 176 | 6.5574 | 4.5799 | 216 | 6.5574 | 5.6271 |
| 137 | 7.5498 | 3.5502 | 177 | 7.5498 | 4.5974 | 217 | 7.5498 | 5.6446 |
| 138 | 8.544 | 3.5637 | 178 | 8.544 | 4.6109 | 218 | 8.544 | 5.6581 |
| 139 | 2 | 3.6652 | 179 | 1 | 4.7124 | 219 | 2 | 5.7596 |
| 140 | 1 | 3.6652 | 180 | 2 | 4.7124 | 220 | 1 | 5.7596 |
| 141 | 8.544 | 3.7667 | 181 | 8.544 | 4.8139 | 221 | 8.544 | 5.8611 |
| 142 | 7.5498 | 3.7802 | 182 | 7.5498 | 4.8273 | 222 | 7.5498 | 5.8745 |
| 143 | 6.5574 | 3.7976 | 183 | 6.5574 | 4.8448 | 223 | 6.5574 | 5.892 |
| 144 | 5.5678 | 3.8214 | 184 | 5.5678 | 4.8686 | 224 | 5.5678 | 5.9158 |
| 145 | 4.5826 | 3.8553 | 185 | 9.1652 | 4.9025 | 225 | 9.1652 | 5.9497 |
| 146 | 9.1652 | 3.8553 | 186 | 4.5826 | 4.9025 | 226 | 4.5826 | 5.9497 |
| 147 | 8.1854 | 3.8784 | 187 | 8.1854 | 4.9256 | 227 | 8.1854 | 5.9728 |
| 148 | 7.2111 | 3.9078 | 188 | 7.2111 | 4.955 | 228 | 7.2111 | 6.0022 |
| 149 | 3.6056 | 3.9078 | 189 | 3.6056 | 4.955 | 229 | 3.6056 | 6.0022 |
| 150 | 6.245 | 3.9462 | 190 | 6.245 | 4.9934 | 230 | 6.245 | 6.0406 |
| 151 | 8.8882 | 3.9618 | 191 | 8.8882 | 5.009 | 231 | 8.8882 | 6.0562 |
| 152 | 5.2915 | 3.9987 | 192 | 5.2915 | 5.0459 | 232 | 5.2915 | 6.0931 |
| 153 | 2.6458 | 3.9987 | 193 | 2.6458 | 5.0459 | 233 | 2.6458 | 6.0931 |
| 154 | 7 | 4.0454 | 194 | 7 | 5.0926 | 234 | 7 | 6.1398 |
| 155 | 8.7178 | 4.0738 | 195 | 8.7178 | 5.121 | 235 | 8.7178 | 6.1682 |
| 156 | 4.3589 | 4.0738 | 196 | 4.3589 | 5.121 | 236 | 4.3589 | 6.1682 |
| 157 | 6.0828 | 4.1065 | 197 | 6.0828 | 5.1537 | 237 | 6.0828 | 6.2009 |
| 158 | 7.8102 | 4.1247 | 198 | 7.8102 | 5.1719 | 238 | 7.8102 | 6.2191 |
| 159 | 3.4641 | 4.1888 | 199 | 3.4641 | 5.236 | 239 | 3.4641 | 6.2832 |
| 160 | 1.7321 | 4.1888 | 200 | 1.7321 | 5.236 | 240 | 1.7321 | 6.2832 |

FROM FIG. 10A

*FIG. 10B*

FIG. 11

METHOD OF TRANSMITTING INFORMATION USING A BANDWIDTH LIMITED COMMUNICATIONS CHANNEL

CROSS-REFERENCE TO RELATED APPLICATIONS

This application claims the benefit of and priority to pending U.S. utility patent application having Ser. No. 10/893,687 for "Method of Sending Information Using Superresolution to Distinguish Overlapping Symbols," which itself claims the benefit of and priority to provisional patent application Ser. No. 60/489,598, the disclosures of which are herein incorporated by reference in their entirety, and all commonly owned.

FIELD OF THE INVENTION

This invention generally relates to methods used for sending information through an information channel at a high rate of transmission and reception with a minimum amount of error.

BACKGROUND

Current methods of sending information through a channel which is bandwidth-limited are limited to a maximum error-free rate or channel capacity of $C=W*\log_2(SN+1)$, where C is the channel capacity, W is the bandwidth, and SN is the signal to noise ratio. Equivalently, for a system with discrete amplitude levels. $C=W*\log_2(N)$, where N is the number of available amplitude levels. The actual error-free transmission rate is of course smaller for discrete systems with noise. For more information see Shannon, C. E., "A Mathematical Method of Communication", Reprinted from *The Bell System Technical Journal*, Vol. 27, July, October 1948, pp 379-423, 623-656. None of the modulation methods developed since the time of Shannon's landmark paper have superseded by more than a few percent the limits placed upon channel capacity presented in the above referenced paper. Embodiments of the present invention supersede the limits derived in the referenced paper by the expedient of sending overlapping symbols or pulses, which are then separated at the receiving end by deconvolution or an equivalent mathematical method. Shannon's derivation of the channel capacity makes the assumption that overlapping symbols or pulses are inseparable, a constraint which is obeyed by the current state of the art.

Previous applications of superresolution methods have been used to increase the amount of information discerned from an information source, but have not been directly applied to increase the transmission capacity of a communications channel. Engeler, et al. in U.S. Pat. Nos. 5,122,732 and 5,168,214 disclose application of superresolution methods to better determine the temporal spectrum of a signal, but did not use this to increase the information capacity or rate of the system. Stankwitz, et al. in U.S. Pat. No. 5,686,922 disclose a superresolution method to resolve beyond diffraction limits in radar. Abatzoglou, et al. in U.S. Pat. No. 5,748,507 disclose a method of using superresolution methods to improve resolution of frequency components of a signal. Cohen, et al. in U.S. Pat. No. 5,784,492 disclose use of a superresolution technique (the CLEAN algorithm) to compress a redundant data set. This method as presented applies to data compression and does not generate any gain in system transmission rate for non-redundant information. Gregory, et al. in U.S. Pat. No. 6,483,952 disclose a method for extracting additional information from an optical sensor system using superresolution methods, particularly with respect to spatial resolution information. Vaughan et. al., "Super-Resolution of Pulsed Multipath Channels for Delay Spread Characterization." in *IEEE Transactions on Communications* vol. 47, no. 3, March 1999, pp. 343-347, utilizes superresolution methods to determine the effects of multipath propagation upon a signal.

Investigations of sending signals faster than Nyquist have been made, but none so far have utilized superresolution methods to cope with intersymbol interference. Landau in "Sampling, Data Transmission, and the Nyquist Rate" *IEEE Proc.* vol. 55, October 1967, pp. 1701-1706 performed calculations showing that for arbitrary signals, transmission beyond the Nyquist rate resulted in unstable measured signals. Later, in "On the Minimum Distance Problem for Faster-than-Nyquist Signaling", *IEEE Trans. Inf. Theory*, vol. 34, no. 6 Nov. 1989, pp. 1420-1427, Landau and Mazo calculate the amount of intersymbol interference generated when binary valued signals are sent with very close spacing. Liveris et al. in "Exploiting faster-than-Nyquist signaling" *IEEE Transactions on Communications* vol. 51, no. 9, September 2003, pp. 1502-1511 also discuss the effect of intersymbol interference upon faster-than-Nyquist signaling, but do not discuss use of superresolution methods to deal with its effects. Zakarevicius et al. in "On the Speed Tolerance of Certain Classes of Data Transmission Systems" *IEEE Transactions on Communications* vol. 34, no. 8, August 1986, pp. 832-836 also analyze the effect of intersymbol interference upon faster-than-Nyquist signaling, but do not discuss the use of superresolution. Wang et al., in "Practically Realizable Digital Transmission Significantly Below the Nyquist Bandwidth" *IEEE Transactions on Communications* vol. 43, no. 2/3/4, February/March/April 1995, pp. 166-169, use digital pulses to transmit with a permissible amount of intersymbol interference, but do not use superresolution methods to detect the relative location of their digital pulses. All of the above methods of faster-than-Nyquist transmission rely upon establishing a maximum permissible level of intersymbol interference, which is less than an amount which can be reliably detected using standard means of pulse detection. This is different from the use of superresolution methods in that any amount of intersymbol interference can be removed by discernment with superresolution methods, subject to the constraints of resolution and noise.

Methods which send a sum of multiple parallel smaller bandwidth signals in place of a single signal occupying a bandwidth equal to the sum of the smaller bandwidths are well known (such as disclosed in U.S. Pat. No. 4,641,318 to Addeo), and may superficially resemble the method described herein, in that the convolution or correlation of a data signal with a small bandwidth signal results in a signal comprised of a sum of small bandwidth signals. However, none of these methods have anticipated using this type of method to achieve superresolution of the signal. Superresolution of the signal is required in order to transmit and receive information through a bandwidth-limited channel at a rate higher than $C=W*\log_2(SN+1)$, which is the object of this invention. The primary differences which the method described herein possesses are that the extent of intersymbol interference induced is very much higher, and orthogonality between subsignals is not needed nor enforced. This is made possible by proper selection of the kernels and the constellation points at which the subsignals may be placed when the convolution is performed. The deconvolution thus places the subsignals at constellation points which can be distinguished in the presence of noise. In addition, accommodation is made for the case where subsignals sent at the same phase are summed and the intended data output must be distinguished by use of a subset-sum algorithm.

SUMMARY

The invention is directed to methods of sending information through a bandwidth-constrained information channel, such as a band-limited radio spectrum by sending overlapping signals which are separated using a superresolution method to distinguish between symbols which are overlapping. One superresolution method may include deconvolution with respect to a kernel. By determining the presence of the symbols in the presence of intersymbol interference, more symbols can be sent per unit time, increasing the data transmission rate.

One method aspect of the invention may comprise transmitting information through a bandwidth-limited communications channel including the steps of providing an input data signal with a binary data rate of greater than twice the Nyquist rate of the communications channel, providing a kernel having a pulse substantially contained within the bandwidth-limited channel, convolving the input data signal with the kernel for providing a convolved signal, sending the convolved signal through a communications channel, receiving the convolved signal, deconvolving the received convolved signal with respect to the kernel for providing a deconvolved signal, and outputting the deconvolved signal.

Another method embodiment for transmitting information through an information channel may comprise providing an input data signal representative of the information with a binary data rate of greater than twice the Nyquist rate of the information channel, providing a kernel having a pulse substantially contained with a bandwidth limit of the channel, convolving the kernel with the input data signal for providing a convoluted signal, modulating the convoluted signal with a carried wave for providing a modulated signal, transmitting the modulated signal, receiving the modulated signal, demodulating the modulated signal with the carrier wave and for extracting the convoluted signal, and deconvolving the convoluted signal with respect to the kernel for providing a received data signal representative of the information.

BRIEF DESCRIPTION OF DRAWINGS

An embodiment of the invention, as well as alternate embodiments are described by way of example with reference to the accompanying drawings in which:

FIGS. 10A and 10B illustrates a transformation in table form between binary and non-binary data formats which is used with the 240-point kernel in FIG. 8, by way of example.

DETAILED DESCRIPTION OF EMBODIMENTS OF THE INVENTION

One embodiment of the invention is directed to a method of information transmission including symbols sent through a bandwidth limited channel being discerned in the presence of intersymbol interference using deconvolution with respect to a known kernel. The method may be described as including two parts, a sending portion as illustrated with reference to FIG. 1, and a receiving portion as illustrated with reference to FIG. 2. In one embodiment as illustrated with continued reference to FIGS. 1 and 2, known kernels 11, 11' are determined, either mathematically using the known response characteristics of a channel 14, or experimentally by testing a frequency response of the channel with a test pulse or chirp. For the embodiment herein described by way of example, the kernels 11, 11' (also referred to as a base pulse) may be identical. Non-identical kernels may be used to implement digital filtering without creating a need for an additional step. Matched filtering is a desirable form of filtering to be implemented using non-identical kernels, as the channel response is already a known quantity. The knowledge of the signal of the kernel is known to both the sender and receiver. The information to be transferred may be represented in a binary data format. The kernel 11, 11' has a minimum time sampling rate of W*N, where W is the bandwidth of the system, and N is the number of kernel pulses sent per Nyquist time period. For best performance, the sample rate should always exceed the Nyquist rate for the system by at least a factor of six. The number of sampled amplitude levels should be equal to N at minimum; sampling additional amplitude levels reduces quantization noise. The data to be transferred 12 is herein represented in a binary format with the same sample rate as the kernel 11. The convolved signal 13 is the convolution of the kernel 11 with the data 12. When the convolved signal 13 is determined, it is sent through the channel 14.

Figure 1:
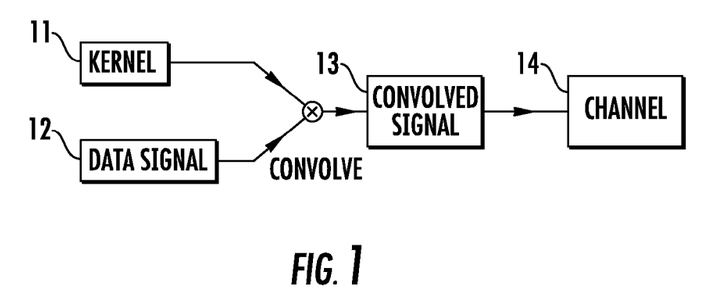
FIG. 1 is a partial flow diagram illustrating an information sending portion of a system and method in keeping with the teachings of the present invention.

The convolution kernel 11 may be determined by the system designer, using trial or simulation to determine that the chosen kernel provides specified system performance. The choice of kernel has a significant effect upon the performance of the method described herein.

As illustrated with reference again to FIG. 2, the second part of the method herein described by way of example, is used for interpreting received data. The received signal 13' is deconvolved with respect to the known kernel 11'. In order to reduce errors, a filtering 15 of the transmitted convolved signal to a frequency passband of the channel may be applied. A deconvolved signal 16 is then rounded 17 to the nearest binary number, resulting in received binary data 12'. The convolution kernel 11s determined by the system designer, using trial or simulation to determine that the chosen kernel provides specified system performance.

Figure 2:
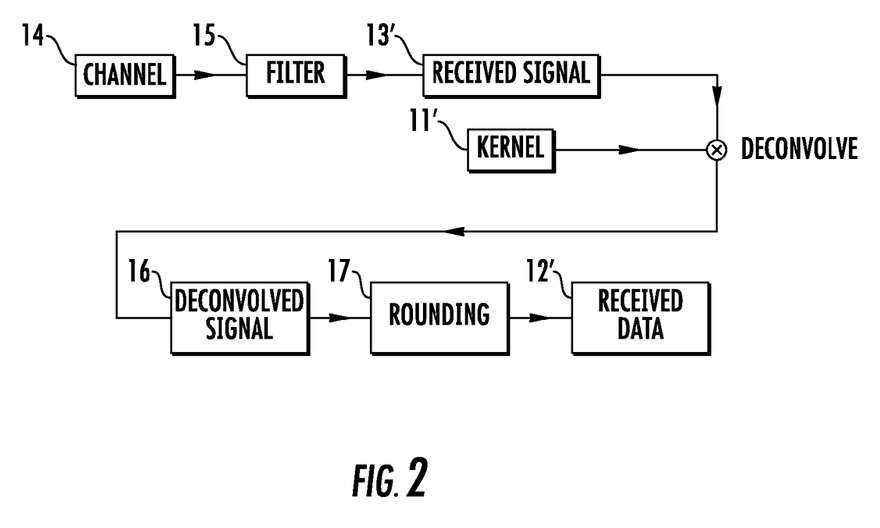
FIG. 2 is a partial flow diagram illustrating an information receiving portion of a system and method in keeping with the teachings of the present invention.

Likewise, a rough estimate of the convolution kernel 11 can be found by convolving the frequency response of the channel 14 with a delta function. Likewise, a rough estimate of the deconvolution kernel 11' can be initially found by convolving the convolution kernel 11 with the frequency response of the channel 14. The system designer may alter these rough initial kernels to achieve system performance objectives. Once a set of kernels has been determined, both sender and receiver must have knowledge of the kernels in order to use this method as described above. A different set of kernels may be further substituted according to a set function or procedure in response to measured changes in channel response, but not without communicating said change to both sender and receiver.

Figure 4:
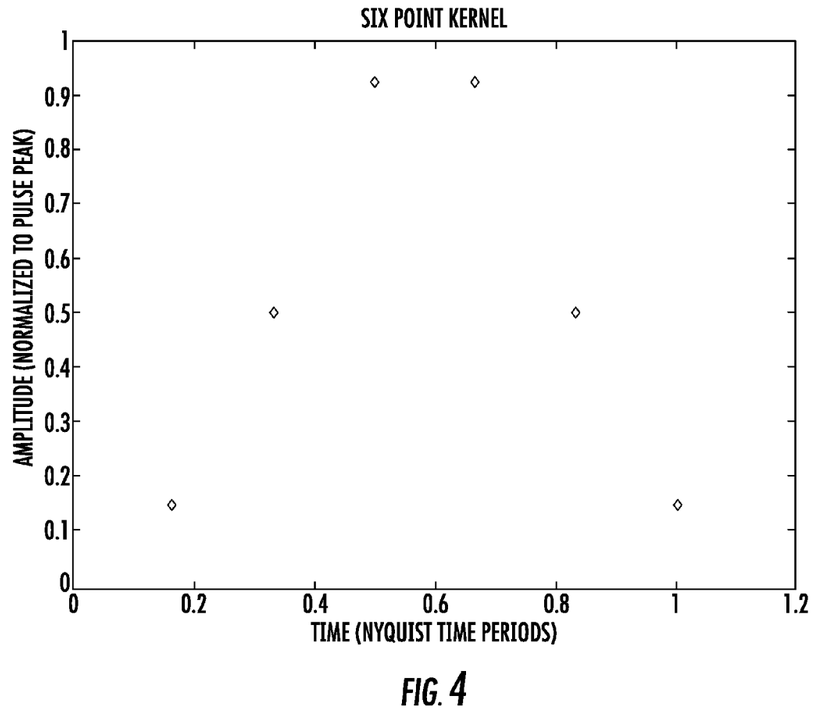
FIG. 4 is an example of a 6 point convolution and deconvolution kernel.
Figure 5:
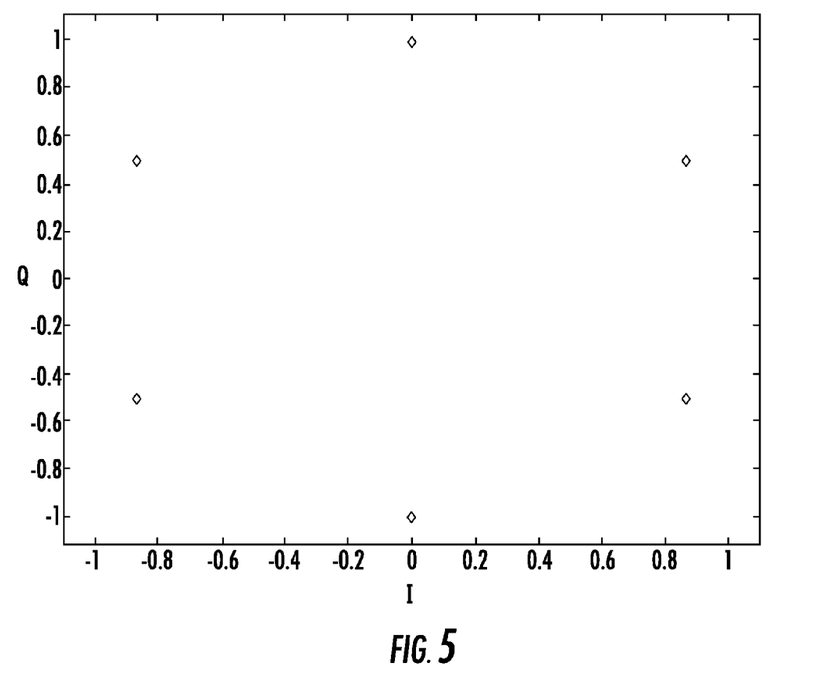
FIG. 5 is a phase constellation diagram showing the possible phase locations of the convolved kernel from FIG. 4.
Figure 6:
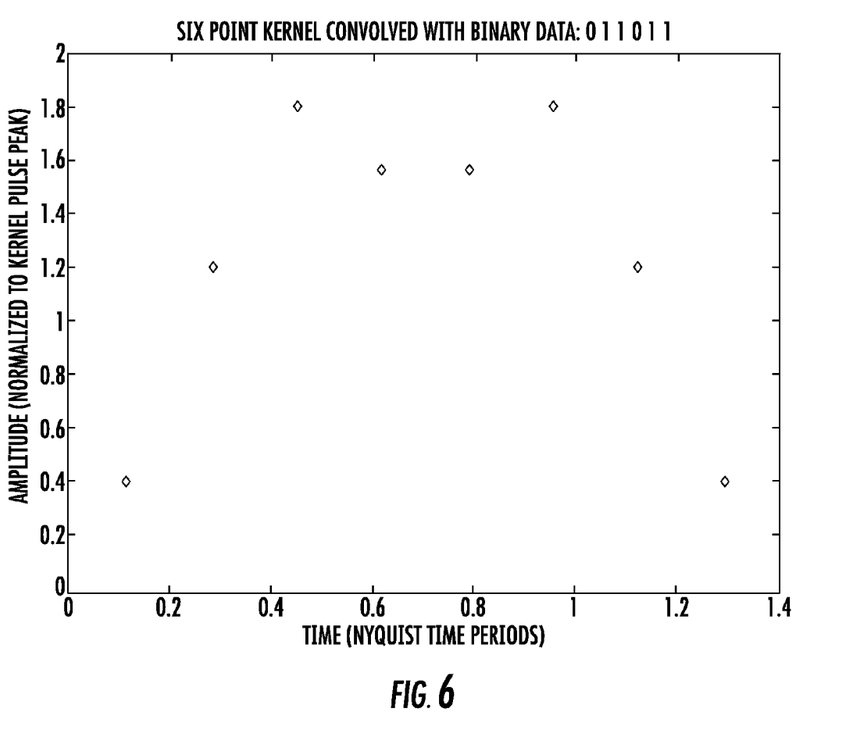
FIG. 6. is an example of a convolved signal using the kernel from FIG. 4.
Figure 7:
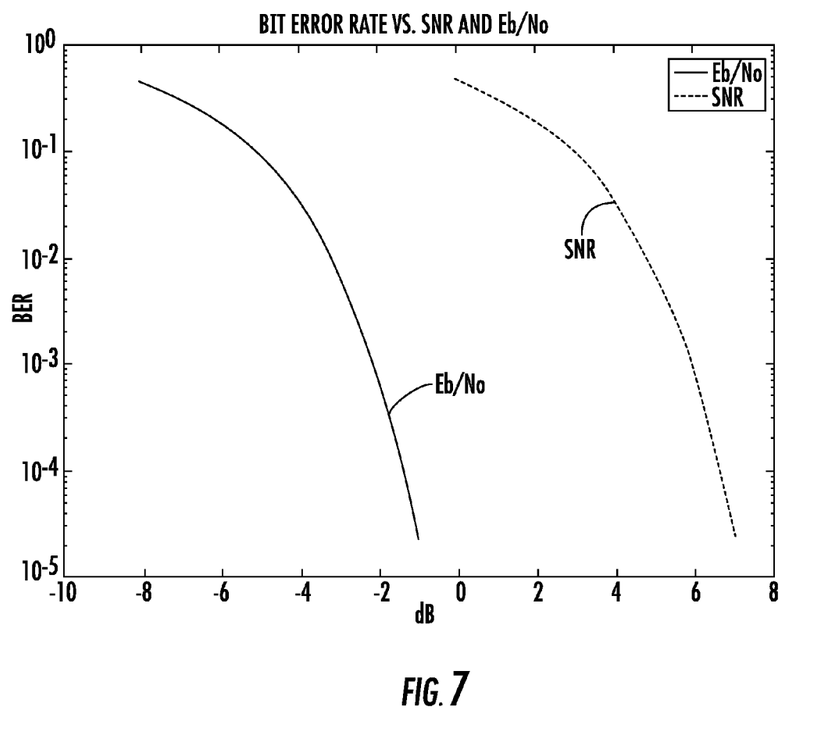
FIG. 7 is a graph of the bit error rate versus both the power signal-to-noise ratio and the ratio of the energy per bit over the noise energy, generated by averaging the bit error rate for 1000 random messages sent through a simulated system using the kernel from FIG. 4, with additive white Gaussian noise, and a Gaussian channel frequency response with a FWHM corresponding to the displayed Nyquist time period.

An example kernel with N=6 is provided in FIG. 4. A phase constellation diagram using this kernel with binary data is provided in FIG. 5. An example of a convolved signal generated using the example kernel is provided in FIG. 6. Note that all the points on the constellation diagram may be used within a single Nyquist time period, in contrast to the traditional use of a constellation diagram wherein only one represented point may be selected per Nyquist time period. FIG. 7 shows the curve of Bit Error Rate vs. both Signal-to-Noise ratio and vs. Eb/No (the number of error bits at varying ratios of signal-to-noise power and energy per bit divided by noise power spectral density) with additive white Gaussian noise for the method described above using this kernel. Comparison of this curve with the BER vs. SNR and Eb/No curves for existing methods with comparable bit transmission rates, bandwidth, and signal-to-noise ratios indicates the performance improvement gained over existing methods. It should be noted when comparing the BER vs. Eb/No curve from this method with state-of-the-art methods that it appears that a very high energy per bit divided by noise power spectral density is required to reach the same bit error rate as state-of-the-art methods. However, examination of the BER vs. SNR curve shows that this is a consequence of the higher bit rate per unit time of this method, which reduces the effective noise energy per bit for a given noise power; thus the high Eb/No at a given bit rate is due to a low noise energy rather than due to a requirement for high energy per bit.

Figure 3:
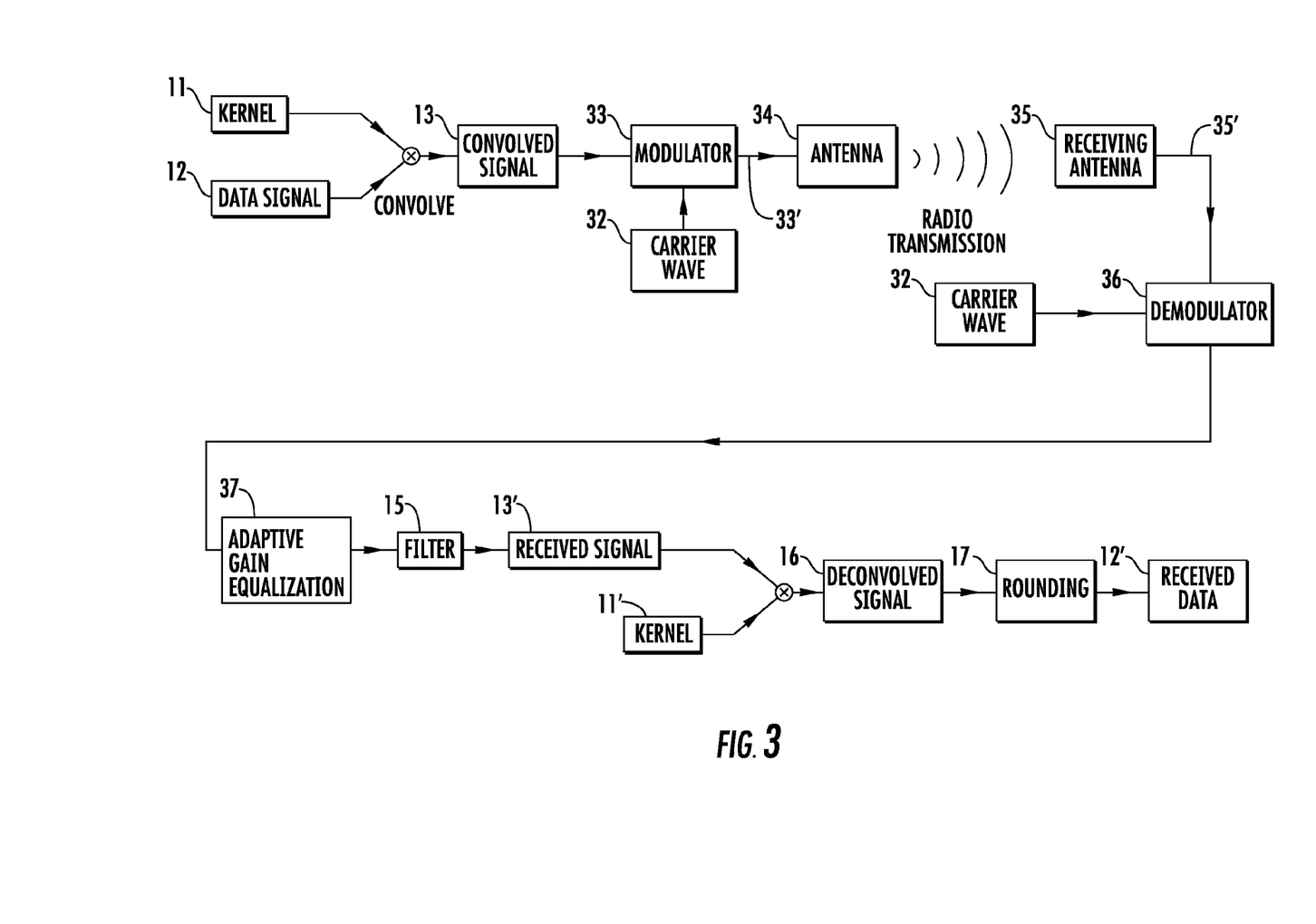
FIG. 3 is a diagrammatical illustration of one embodiment of the present invention employing radio communications for sending and receiving information.

With reference now to FIG. 3, one embodiment may comprise the method described above with reference to FIGS. 1 and 2 within a radio communications system. By way of example, the data signal 12 to be sent is first convolved with the kernel 11 using the method described above. The convolved signal 13 produced is then used to modulate 33 a carrier wave 32. This modulated signal 33' is then transmitted via an antenna 34, and received at a receiving antenna 35. The received signal 35' is demodulated 36 using the carrier wave 32. Adaptive gain equalization 37 is applied to the resulting signal. This modified received signal 13' is then deconvolved 16 using the kernel 11' as described above, yielding the received data 12'. Rounding 17 may also be employed as above described.

As a point of interest, when rounding of the result of the filtered deconvolution is applied, a mean noise amplitude of greater than half the mean amplitude of the base pulse preferably occurs during the time period that a base pulse or kernel is the additive part of the signal in order for an error to be registered in the received data.

As herein described, in addition to sending the signal generated through the bandwidth-constrained channel, the signal may also be used to modulate another signal, so that the resultant signal fits within the bandwidth constraints without distortion. This can be used, for example, to modify a sound signal to fit within a narrower bandwidth, which is then used to modulate an FM signal. As the bandwidth of the FM signal is a function of the bandwidth of the signal used to modulate it, this thus reduces the bandwidth of the FM signal. It should be noted that the modulated signal preferably includes a sample rate high enough that overlapping signals can be distinguished, or be analog in nature.

Figure 8:
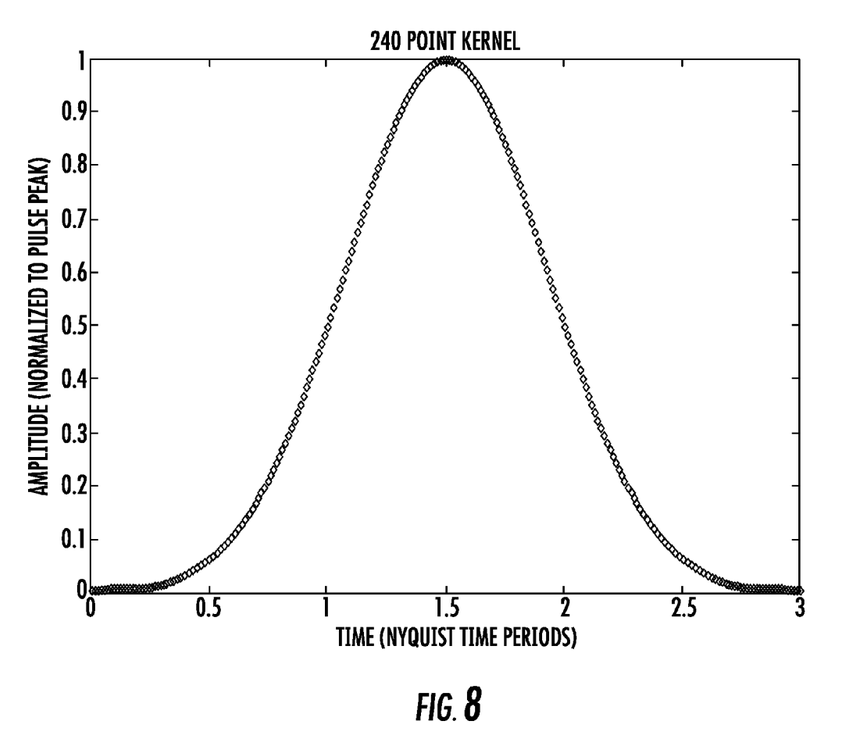
FIG. 8 is a depiction of an example 240 point convolution and deconvolution kernel.
Figure 9:
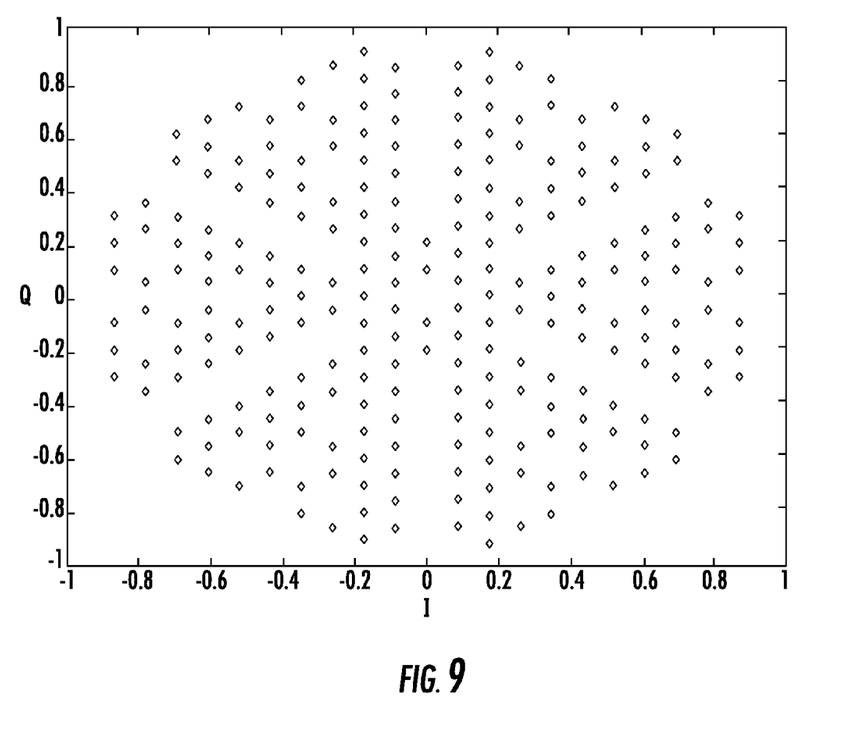
FIG. 9 is a phase constellation diagram showing the possible phase locations of the convolved kernel from FIG. 8.
Figure 11:
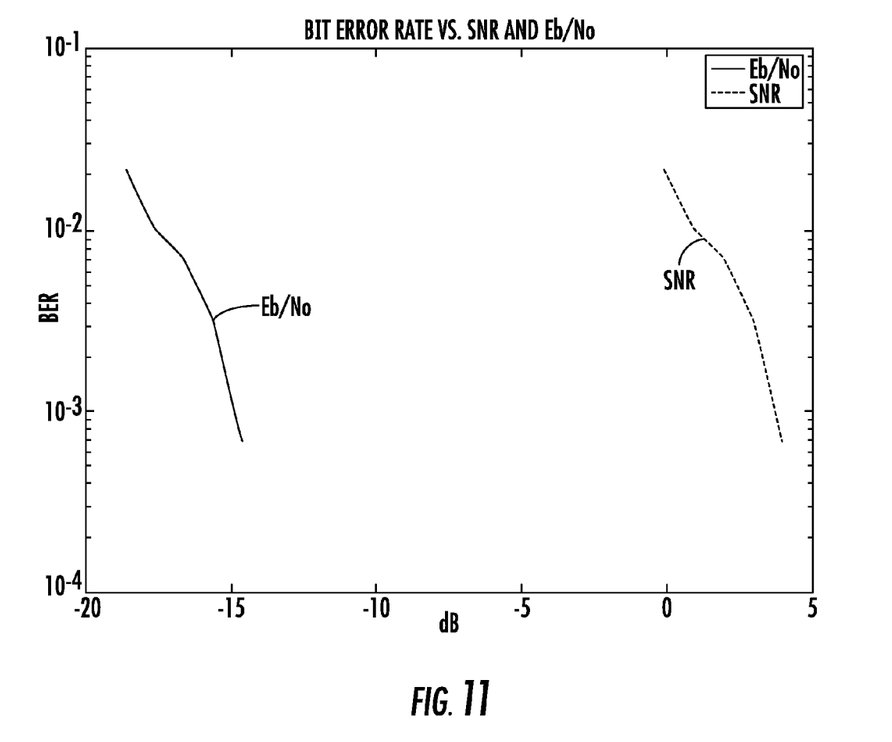
FIG. 11 is a graph of the bit error rate versus both the power signal-to-noise ratio and the ratio of the energy per bit over the noise energy, generated by averaging the bit error rate for 100 random messages sent through a simulated system using the kernel from FIG. 8, with additive white Gaussian noise, and a Gaussian channel frequency response with a FWHM corresponding to the displayed Nyquist time period.

By way of example for alternate embodiments, when the data to be sent is in other than binary data format, the rounding step may round to the nearest data point which lies within the format used. An example of this is provided with the N=240 kernel and accompanying phase constellation diagram in FIGS. 8 and 9, respectively. The non-binary data format is indicated by the notation in the table of FIGS. 10A and 10B. Note that this non-binary data-format is a transformation in both phase and amplitude; a simple amplitude transformation such as converting each 8 bit segment into a 256-level amplitude value will result in a higher bit error rate than a data format such as depicted in the table of FIGS. 10A and 10B. This transformation between the non-binary data format and binary data format is designed such that deconvolution of the signal with respect to the kernel will generate a point on the phase constellation which is not likely to be mistaken either for a different constellation point or the deconvolved result of the kernel convolved with a sum of other constellation points. Different amplitude points at the same phase are differentiated using a subset sum algorithm. This constraint applies to all transformations between binary and non-binary formats used in this alternate embodiment. Design of the optimum non-binary data format for a given application can be done by applying mathematical optimization techniques using the above constraint, noting that the optimum design will vary with both the kernel used and the signal-to-noise ratios which are expected. Thus, the data transformation in the table of FIGS. 10A and 10B does not yield the optimum placement of phase constellation points; nevertheless, this transformation used with the kernel in FIG. 8 provides performance benefits over the current state of the art. FIG. 11 shows the BER vs. SNR and BER vs. Eb/No curve with additive white Gaussian noise for the alternate embodiment described using this kernel. The use of this alternate embodiment (transformation to non-binary data formats) is desirable at signal-to-noise ratios much greater than 1, due to the greater rate of information transmission without increase in number of error bits.

Alternatively to the method above described, the filtering or error checking steps may be omitted. Yet further, the signal used to modulate another signal may be contained in the same device or process. The superresolution method may be used to facilitate an increase in range or reduction in power needed for transmission. Two different kernels 11, 11' may be used with one used for convolution and the other for deconvolution.

As will come to the mind of those skilled in the art, now having the benefit of the teachings of the present invention, other embodiments are possible without departing from the essential characteristics of the invention. For example, non-essential but helpful steps such as rounding or filtering may be omitted, or the deconvolution may be accomplished by equivalent means. From the above description, it will be apparent that the invention disclosed herein provides a novel and advantageous method of reducing the bandwidth requirements for a particular information transmission rate. The foregoing discussion discloses and describes merely exemplary methods and embodiments of the present invention. Accordingly, the disclosure of the present invention is intended to be illustrative, but not limiting, of the scope of the invention, which is set forth in the following claims.

That which is claimed is:

1. A method of transmitting information between first and second communications devices and through a bandwidth-limited communications channel, the method comprising:

providing, at the first communications device, an input data signal with a binary data rate greater than twice a Nyquist rate of the bandwidth-limited communications channel;

providing, at the first communications device, a first kernel having a pulse contained within the bandwidth-limited communications channel;

convolving, at the first communications device, the input data signal with the first kernel for providing a convolved signal, the convolved signal being used to modulate another signal within the bandwidth-limited communications channel;

sending, from the first communications device to the second communications device, the convolved signal through the bandwidth-limited communications channel;

receiving the convolved signal at the second communications device;

deconvolving the received convolved signal with respect to the first kernel for providing a deconvolved signal, the deconvolving comprising deconvolving with a second deconvolving kernel, the second deconvolving kernel combining a function of the first kernel and a digital matched filter; and outputting the deconvolved signal at the second communications device.

2. A method as recited in claim 1, further comprising error correcting after the deconvolving, the error checking including at least one of filtering, rounding and using checkbits.

3. A method as recited in claim 1, wherein the bandwidth-limited communications channel is operable within a radio communications system.

4. A method as recited in claim 1, further comprising finding the pulse of the first kernel by convolving a frequency response of the bandwidth-limited communications channel with a delta function.

5. A method as recited in claim 4, further comprising modifying the first kernel to be contained within the band-limited communications channel by measuring a frequency response of the band-limited communications channel with a test signal.

6. A method as recited in claim 1, wherein the convolving and deconvolving comprise digital processing.

7. A method as recited in claim 1, wherein the input data signal and the first kernel have a same sample rate.

8. A method as recited in claim 1, further comprising facilitating at least one of an increase in range and a reduction in power for transmission.

9. A method as recited in claim 1, further comprising filtering the convolved signal prior to deconvolving for filtering out-of-band noise.

10. A method as recited in claim 1, wherein the input data signal and the first kernel include analog signals approximated by digital signals.

11. A method as recited in claim 1, wherein the input data signal comprises a non-binary data format signal, and has a bit data rate at least twice the Nyquist rate of the bandwidth-limited communications channel divided by a base-2 logarithm of a number of amplitude levels in the non-binary data format signal.

12. A method as recited in claim 11, wherein the non-binary data format signal is selected so as to minimize bit error rate.

13. A method as recited in claim 11, wherein data outputs of differing amplitude coinciding at a phase location are differentiated using a subset-sum algorithm.

14. A method of transmitting information between first and second communications devices and through an information channel, the method comprising:

providing, at the first communications device, an input data signal representative of information with a binary data rate greater than twice a Nyquist rate of the information channel;

providing, at the first communications device, a first kernel having a pulse contained within a bandwidth limit of the information channel;

convolving, at the first communications device, the first kernel with the input data signal for providing a convoluted signal;

modulating, at the first communications device, the convoluted signal with a carrier wave for providing a modulated signal;

transmitting, from the first communications device to the second communications device, the modulated signal;

receiving the modulated signal at the second communications device;

demodulating the modulated signal with the carrier wave for extracting the convoluted signal; and deconvolving the convoluted signal with respect to the first kernel for providing a received data signal representative of the information at the second communications device, the deconvolving comprising deconvolving with a second deconvolving kernel, the second deconvolving kernel combining a function of the first kernel and a digital matched filter.

15. A method as recited in claim 14, further comprising after the deconvolving, performing at least one of filtering, rounding and using checkbits.

16. A method as recited in claim 14, wherein the convolving and deconvolving comprise digital processing.

17. A method as recited in claim 14, further comprising filtering an extracted convolved signal prior to deconvolving for filtering out-of-band noise.

18. A method of transmitting information between first and second communications devices and through a bandwidth-limited communications channel, the method comprising:

providing, at the first communications device, an input data signal with a binary data rate greater than twice a Nyquist rate of the bandwidth-limited communications channel;

providing, at the first communications device, a first kernel having a pulse contained within the bandwidth-limited communications channel;

convolving, at the first communications device, the input data signal with the first kernel for providing a convolved signal;

sending, from the first communications device to the second communications device, the convolved signal through the bandwidth-limited communications channel;

receiving the convolved signal at the second communications device;

deconvolving the received convolved signal with respect to the first kernel for providing a deconvolved signal, the deconvolving comprising filtering by performing the deconvolution with a second deconvolving kernel which combines a function of the second deconvolving kernel and a digital filter, the deconvolving comprising deconvolving with the second deconvolving kernel, the second deconvolving kernel combining a function of the first kernel and a digital matched filter; and outputting the deconvolved signal at the second communications device.

* * * * *